(12) United States Patent
Otaki et al.

(10) Patent No.: US 6,509,076 B1
(45) Date of Patent: Jan. 21, 2003

(54) PRESSURE-SENSITIVE ADHESIVE FOR PRESSURE-SENSITIVE ADHESIVE LAYER IN VOLUME HOLOGRAM LAMINATE

(75) Inventors: Hiroyuki Otaki, Tokyo-To (JP); Kenji Ueda, Tokyo-To (JP); Kazumasa Shinga, Tokyo-To (JP); Masahiro Kawasaki, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 75 days.

(21) Appl. No.: 09/679,537

(22) Filed: Oct. 6, 2000

(30) Foreign Application Priority Data

Oct. 8, 1999 (JP) .............................. 11-287779

(51) Int. Cl.[7] .......................... G03H 1/04; B32B 7/12; B32B 15/04
(52) U.S. Cl. ............... 428/40.1; 430/2; 430/1; 428/343; 428/354; 428/355 AC
(58) Field of Search ............ 428/343, 355 AC, 428/354, 40.1; 430/1, 2

(56) References Cited

U.S. PATENT DOCUMENTS

| 4,994,322 A | * | 2/1991 | Delgado et al. | ............ | 428/343 |
| 5,118,750 A | * | 6/1992 | Silver et al. | ............... | 524/462 |

FOREIGN PATENT DOCUMENTS

| EP | 1090971 A1 | * | 11/2001 |
| EP | 1091267 A2 | * | 11/2001 |
| FR | 1253430 | | 5/1961 |
| GB | 644291 | | 10/1950 |
| JP | 03012471 | * | 1/1991 |
| JP | 11158453 | * | 11/1997 |

OTHER PUBLICATIONS

AN 91–343699/47: Documentation Abstracts Journal A. Plastics, Polymers., XP002156407 Derwent Publications, London., GB & JP 03 229783 A (Sekisui Chem Ind KK) Oct. 11, 1991.

* cited by examiner

Primary Examiner—Daniel Zirker
Assistant Examiner—Victor S Chang
(74) Attorney, Agent, or Firm—Parkhurst & Wendel, L.L.P.

(57) ABSTRACT

A pressure-sensitive adhesive for a pressure-sensitive adhesive layer in a volume hologram laminate is provided which, when kept in the pressed state, for example, during storage, is less likely to cause spotty hologram defects in the volume hologram layer. The pressure-sensitive adhesive for a pressure-sensitive adhesive layer in a volume hologram laminate is a pressure-sensitive adhesive for a pressure-sensitive adhesive layer in a volume hologram laminate comprising a substrate 2 and, stacked on the substrate 2 in the following order, a first pressure-sensitive adhesive layer 3, a volume hologram layer 5, a second pressure-sensitive adhesive layer 4, and a surface protective film 6, the second pressure-sensitive adhesive layer having been formed from an acrylic pressure-sensitive adhesive comprising an acrylic copolymer resin, composed mainly of an alkyl acrylate, and a crosslinking agent, the second pressure-sensitive adhesive layer having a dynamic storage modulus of not less than $2.5 \times 10^5$ Pa as measured at a measuring frequency of 6.28 rad/sec and a temperature of 50° C. and a loss tangent (tan δ) defined as dynamic loss modulus/dynamic storage modulus at 120° C. of not more than 0.15.

3 Claims, 6 Drawing Sheets

PRESSURE-SENSITIVE ADHESIVE FOR PRESSURE-SENSITIVE ADHESIVE LAYER IN VOLUME HOLOGRAM LAMINATE

TECHNICAL FIELD

The present invention relates to a pressure-sensitive adhesive for a pressure-sensitive adhesive layer in a volume hologram laminate which can reduce spotty hologram defects caused in a stacked and/or pressed state in transit or during storage in warehouses or the like.

BACKGROUND ART

Conventional volume hologram laminates generally have a construction comprising a substrate and, stacked on the substrate in the following order, a pressure-sensitive adhesive layer, a volume hologram layer, a pressure-sensitive adhesive layer, and a transparent protective film. Volume hologram laminates applied to various forms of substrates, such as identification cards or papers, admission tickets for examination, ID cards, booklets such as passports, have been developed. However, volume hologram laminates using, as a dry volume phase type hologram recording material, a recording material comprising a matrix polymer and a photopolymerizable compound pose a problem of the occurrence of spotty hologram defects when the volume hologram materials applied, for example, to books or the like are kept in a stacked and/or pressed state in transit or during storage in warehouses or the like.

The spotty hologram defects are found when the hologram-recorded layer is observed. The spots are in the form of ellipse having a size of 0.2 to 2 mm in major axis and about 0.1 to 1.5 mm in minor axis, or in the form of a circle having a radius of about 0.1 to 2 mm, and occur in a regularly arranged state. The hologram defects depend upon a light source or a viewing angle. Therefore, the hologram defects are considered as holographic defects rather than as defects attributable to the inclusion of air bubbles or foreign matter in the volume hologram layer.

DISCLOSURE OF THE INVENTION

Accordingly, it is an object of the present invention to provide a pressure-sensitive adhesive for a pressure-sensitive adhesive layer in a volume hologram laminate which, when kept in the pressed state, for example, during storage, is less likely to cause spotty hologram defects in the volume hologram layer.

According to one aspect of the present invention, there is provided a pressure-sensitive adhesive for a pressure-sensitive adhesive layer in a volume hologram laminate comprising a substrate and, stacked on the substrate in the following order, a first pressure-sensitive adhesive layer, a volume hologram layer, a second pressure-sensitive adhesive layer, and a surface protective film, said second pressure-sensitive adhesive layer having been formed from an acrylic pressure-sensitive adhesive comprising an acrylic copolymer resin, composed mainly of an alkyl acrylate, and a crosslinking agent, said second pressure-sensitive adhesive layer having a dynamic storage modulus of not less than $2.5 \times 10^5$ Pa as measured at a measuring frequency of 6.28 rad/sec and a temperature of 50° C. and a loss tangent (tan δ) defined as dynamic loss modulus/dynamic storage modulus at 120° C. of not more than 0.15.

According to a preferred embodiment of the present invention, the crosslinking agent is a crosslinking agent for room temperature crosslinking.

According to another preferred embodiment of the present invention, the crosslinking agent is a crosslinking agent for heat crosslinking.

BEST MODE FOR CARRYING OUT THE INVENTION

The present inventor has found that hologram defects in a volume hologram laminate are attributable to a correlation between the hardness of the volume hologram layer and the hardness of a pressure-sensitive adhesive layer provided between the volume hologram layer and the surface protective film, which has led to the completion of the present invention.

Figure 1:
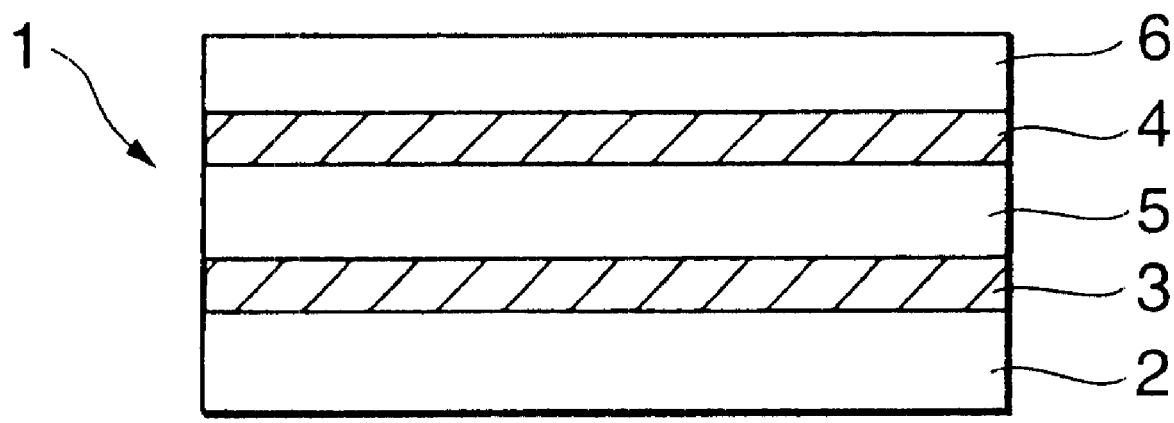
FIG. 1 is an explanatory cross-sectional view of a volume hologram laminate according to the present invention.

The volume hologram laminate according to the present invention is shown in FIG. 1 (a cross-sectional view). In the drawing, numeral 1 designates a volume hologram laminate, numeral 2 a substrate, numeral 3 a first pressure-sensitive adhesive layer, numeral 4 a second pressure-sensitive adhesive layer, numeral 5 a volume hologram layer, and numeral 6 a surface protective film.

Films or sheets of paper, synthetic paper, synthetic resins or metals may be used as the substrate 2 in the volume hologram laminate. The substrate 2 may take various forms, for example, sheets such as admission tickets for examination, cards such as ID cards, or booklets such as passports. In this case, a volume hologram material with a photograph of a face, a scene or the like being hologram recorded therein in a single color or a full color is applied to the substrate. When the volume hologram laminate is used as a color filter for liquid crystal display devices, the glass substrate or electrode layer in the liquid crystal cell is the substrate.

The volume hologram laminate shown in FIG. 1 has a construction comprising a volume hologram layer 5 stacked on a substrate 2 through a first pressure-sensitive adhesive layer 3. Alternatively, the volume hologram laminate may have a structure comprising the volume hologram layer 5 stacked on the substrate 2 through a pressure-sensitive adhesive double coated tape. In this case, a first pressure-sensitive adhesive layer 3, a volume hologram layer 5, a second pressure-sensitive adhesive layer 4, and a surface protective film 6 may be stacked in that order on the substrate 2 through a pressure-sensitive adhesive layer and a plastic film, such as a transparent or colored polyethylene terephthalate film.

The volume hologram layer 5 is such that, after coating of a volume hologram recording material on a support film, interference fringes corresponding to the wave surface of light from an object have been recorded in the form of transmission modulation or refractive index modulation within the layer and, also in the duplication, can be easily prepared by bringing an original plate of a volume hologram into close contact with the volume hologram layer 5 and then performing exposure and development.

The volume hologram layer 5 is a photosensitive material for dry volume phase type hologram recording, comprising a matrix polymer, a photopolymerizable compound, a photopolymerization initiator, a sensitizing dye, and an optionally added plasticizer.

Photopolymerizable compounds include photopolymerizable, photocrosslinkable monomers, oligomers, and prepolymers having at least one ethylenically unsaturated bond per molecule which will be described later, and mixtures of the above compounds, for example, unsaturated carboxylic acids and salts thereof, esters of unsaturated carboxylic acids with aliphatic polyhydric alcohol compounds, and compounds in which unsaturated carboxylic acids are linked to aliphatic polyamine compounds by an amide linkage.

Specific examples of monomers of unsaturated carboxylic acids include acrylic acid, methacrylic acid, itaconic acid, crotonic acid, isocrotonic acid, maleic acid, and the above unsaturated carboxylic acids substituted with a halogen, for example, chlorinated unsaturated carboxylic acids, brominated unsaturated carboxylic acids, and fluorinated unsaturated carboxylic acids. Salts of unsaturated carboxylic acids include sodium and potassium salts of the above acids.

Regarding specific examples of monomers of esters of aliphatic polyhydric alcohol compounds with unsaturated carboxylic acids, acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, o-biphenyl methacrylate, and o-biphenyl acrylate.

Methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxy)phenyl]dimethylmethane, 2,2-bis(4-methacryloyloxyphenyl)propane, and 2-naphthyl methacrylate.

Itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Crotonic esters include ethylene glycol dicrotonate, tetramethylene glycol dicrotonate, pentaerythritol dicrotonate, and sorbitol tetracrotonate.

Isocrotonic esters include ethylene glycol diisocrotonate, pentaerythritol diisocrotonate, and sorbitol tetraisocrotonate.

Maleic esters include ethylene glycol dimaleate, triethylene glycol dimaleate, pentaerythritol dimaleate, and sorbitol tetramaleate.

Halogenated unsaturated carboxylic acids and esters thereof usable herein include 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (tradename: NK Ester DBN, manufactured by Shin-Nakamura Chemical Co., Ltd.), dibromopropyl acrylate (tradename: NK Ester A-DBP, manufactured by Shin-Nakamura Chemical Co., Ltd.), dibromopropyl methacrylate (tradename: NK Ester DBP, manufactured by Shin-Nakamura Chemical Co., Ltd.), methacrylic acid chloride, 2,4,6-trichlorophenyl methacrylate, methyl 2-chloroacrylate, ethyl 2-chloroacrylate, n-butyl-2-chloroacrylate, tribromophenol acrylate, and tetrabromophenol acrylate.

Specific examples of monomers of compounds, in which unsaturated carboxylic acids are linked to aliphatic polyamine compounds by an amide linkage, include methylenebisacrylamide, methylenebismethacryl-amide, 1,6-hexamethylenebisacrylamide, 1,6-hexamethylenebismethacrylamide, diethylenetriamine trisacrylamide, xylylenebisacrylamide, xylylene-bismethacrylamide, N-phenylmethacrylamide, and diacetoneacrylamide.

Other examples include polyisocyanate compounds having two or more isocyanate groups per molecule described in Japanese Patent Publication No. 41708/1973 and vinyl urethane compounds having two or more polymerizable vinyl groups per molecule with a hydroxyl-containing vinyl monomer represented by the following general formula being added thereto.

wherein R and R' each independently represent a hydrogen atom or a methyl group.

Urethane acrylates described in Japanese Patent Laid-Open No. 37193/1976 and polyester acrylates and polyfunctional acrylates and methacrylates, prepared from epoxy resin and (meth)acrylic acid or the like, described in Japanese Patent Laid-Open No. 64183/1973 and Japanese Patent Publication Nos. 43191/1974 and 30490/1977 may also be used.

Further, compounds introduced as photocurable monomers and oligomers in Journal of the Adhesion Society of Japan, Vol. 20, No. 7, 300–308 may also be used.

Regarding other examples, phosphorus-containing monomers include: mono(2-acryloyloxyethyl) acid phosphate (tradename: Light Ester PA, manufactured by Kyoeisha Chemical Co., Ltd.) and mono(2-methacryloyloxyethyl) acid phosphate (tradename: Light Ester PM, manufactured by Kyoeisha Chemical Co., Ltd.); and epoxy acrylate monomers (tradename: Ripoxy VR-60, manufactured by Showa High Polymer Co., Ltd.; and tradename: Ripoxy VR-90, manufactured by Showa High Polymer Co., Ltd.).

NK Ester M-230G (tradename: manufactured by Shin-Nakamura Chemical Co., Ltd.) and NK Ester 23G (tradename: manufactured by Shin-Nakamura Chemical Co., Ltd.) are also usable.

Further examples of monomers include: triacrylates represented by formulae:

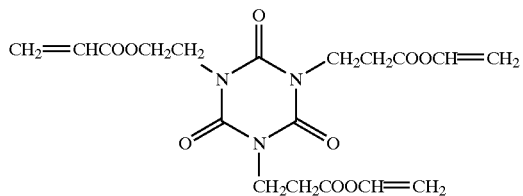

(tradename: Aronix M-315, manufactured by Toa Gosei Chemical Industry Co., Ltd.)

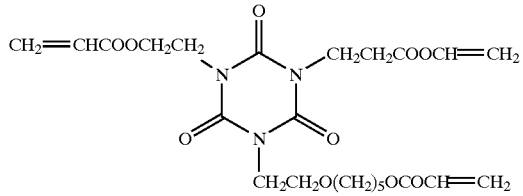

(tradename: Aronix M-325, manufactured by Toa Gosei Chemical Industry Co., Ltd.); 2,2'-bis(4-acryloxy-diethoxyphenyl)propane (tradename: NK Ester A-BPE-4, manufactured by Shin-Nakamura Chemical Co., Ltd.); and tetramethylolmethane tetraacrylate (tradename: NK Ester A-TMMT, manufactured by Shin-Nakamura Chemical Co., Ltd.).

Plasticizers, which may be optionally added, include: polyhydric alcohols, such as ethylene glycol, diethylene glycol, triethylene glycol, glycerin, and trimethylolpropane; phthalic ester plasticizers, such as dimethyl phthalate (DMP), diethyl phthalate (DEP), dibutyl phthalate (DBP), heptylnonyl phthalate (HNP), di-2-ethylhexyl phthalate (DOP), di-n-octyl phthalate (DNOP), di-i-octyl phthalate (DCapP), (79 alkyl) phthalate (D79P), di-i-decyl phthalate (DIDP), ditridecyl phthalate (DTDP), dicyclohexyl phthalate (DCHP), butylbenzyl phthalate (BDP), ethylphthalyl-ethyl glycolate (EPEG), and butylphthalylbutyl glycolate (BPBG); aliphatic dibasic acid ester plasticizers, such as di-2-ethylhexyl adipate (DOA), di-(methylcyclohexyl) adipate, diisodecyl adipate (DIDA), di-n-hexyl azelate (DNHZ), di-2-ethylhexyl azelate (DOZ), dibutyl sebacate (DBS), and di-2-ethylhexyl sebacate (DOS); citric ester plasticizers, such as triethyl citrate (TEC), tributyl citrate (TBC), triethyl acetylcitrate (ATEC), and tributyl acetylcitrate (ATBC); epoxy plasticizers, such as epoxidized soybean oil; and phosphoric ester plasticizers, such as tributyl phosphate (TBP), triphenyl phosphate (TPP), tricresyl phosphate (TCP), and tripropylene glycol phosphate.

Regarding initiator systems, photopolymerization initiators include, for example, 1,3-di(t-butyldioxycarbonyl) benzophenone, 3,3',4,4'-tetrakis(t-butyldioxycarbonyl) benzophenone, N-phenylglycine, 2,4,6-tris (trichloromethyl)-s-triazine, 3-phenyl-5-isoxazolone, 2-mercaptobenzimidazole, and dimers of imidazole. Preferably, the photopolymerization initiator is decomposed after recording of the hologram from the viewpoint of stabilizing the recorded hologram. For example, an organic peroxide system is preferred because it can be easily decomposed upon ultraviolet irradiation.

Examples of sensitizing dyes include dyes having absorption of light at 350 to 600 nm, such as thiopyrilium salt, merocyanine, quinoline, styrylquinoline, ketocoumarin, thioxanthene, xanthene, oxonol, cyanine, rhodamine, thiopyrilium salt, pyrilium ion, and diphenyliodonium ion dyes. Sensitizing dyes having absorption of light in a wavelength region of not more than 350 nm or not less than 600 nm may also be used.

Matrix polymers usable herein include polymethacrylic esters or partial hydrolyzates thereof, polyvinyl acetate or hydrolyzates thereof, polyvinyl alcohol or partial acetalization products thereof, triacetylcellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or derivatives thereof, poly-N-vinylpyrrolidone or derivatives thereof, copolymer of styrene with maleic anhydride or semi-esters thereof, and copolymers using, as a comonomer, at least one monomer selected from copolymerizable monomers, such as acrylic acid, acrylic esters, methacrylic acid, methacrylic esters, acrylamide, acrylonitrile, ethylene, propylene, vinyl chloride, and vinyl acetate, and mixtures of the above polymers. Preferred are polyisoprene, polybutadiene, polychloroprene, polyvinyl alcohol or partial acetalization products of polyvinyl alcohol, e.g., polyvinyl acetal, polyvinyl butyral, polyvinyl acetate, ethylene/vinyl acetate copolymer, and vinyl chloride/vinyl acetate copolymer, or mixtures of the above polymers.

The recorded hologram may be stabilized through monomer transfer by heating. To this end, the matrix polymer preferably has a relatively low glass transition temperature and can facilitate the monomer transfer.

The amount of the photopolymerizable compound used is generally 10 to 1,000 parts by weight, preferably 10 to 100 parts by weight, based on 100 parts by weight of the binder resin as a matrix polymer.

The amount of the photopolymerization initiator used is generally 1 to 10 parts by weight, preferably 5 to 10 parts by weight, based on 100 parts by weight of the binder resin (matrix polymer).

The amount of the sensitizing dye used is generally 0.01 to 1 part by weight, preferably 0.01 to 0.5 part by weight, based on 100 parts by weight of the binder resin (matrix polymer).

Other photosensitive material components include various nonionic surfactants, cationic surfactants, and anionic surfactants.

The hologram-recording material is added, for example, to acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol, or a mixed solvent composed of the above solvents to prepare a coating liquid having a solid content of 15 to 25% by weight. The thickness of the hologram-recording layer is generally 0.1 to 50 µm, preferably 5 to 20 µm.

Such hologram-recording materials include, for example, Omnidex 352 or 706 manufactured by E. I. du Pont de Nemours & Co.

Examples of recording lights for the volume hologram layer according to the present invention include: krypton laser (1.5 W) (wavelength 337.5 nm, 350.7 nm, or 356.4 nm); argon laser (40 mW) (wavelength 351.1 nm or 368.8 nm); neon laser (50 mW) (wavelength 332.4 nm); cadmium laser (15 mW) (wavelength 325.0 nm); and, in a visible light region, argon laser (wavelength 514.5 nm, 488 nm, or 457.9 nm) and krypton laser (wavelength 647.1 nm, 568.2 nm, or 520.8 nm). One of these wavelengths is taken out, and applied to excite the photopolymerization initiator to perform recording of a monochromatic hologram or a color hologram.

The volume hologram layer according to the present invention (when the volume hologram layer is specified by various properties, the volume hologram layer hereinafter refers to a volume hologram layer with a hologram recorded thereon) has a glass transition point of 30 to 70° C., preferably 35 to 60° C.

For the volume hologram layer according to the present invention, the dynamic storage modulus is one of the properties which reflects the hardness of the volume hologram layer. The dynamic storage modulus is measured by the following equipment and method.

Sample: Hologram recording film: A volume hologram film prepared by recording a hologram on a laminate film of polyethylene terephthalate film (hereinafter referred to as "PET film")/volume hologram layer/polyvinyl chloride film or PET film and then pleeling off the PET film as the uppermost layer or the polyvinyl chloride film or the PET film as the lowermost layer.

Equipment: Solid viscoelastic analyzer RSA-II (manufactured by Rheometrics)

Attachment (mode): For pulling of film

Frequency: 6.28 rad/sec

Temp.: −50° C. to 100° C.

Method:
(1) The measuring sample is set to a fixture for tensile measurement of a film.
(2) The temperature dependency at 6.28 rad/sec in a temperature region of −50° C. to 100° C. is measured. The dynamic storage modulus (E', Pa) at 50° C. is determined from data on the temperature dependency. The temperature 50° C. was selected from the viewpoint of comparison with the hardness in the stored state in warehouses or the like in the summer period. The volume hologram layer according to the present invention has a dynamic storage modulus of $5 \times 10^5$ Pa to $5 \times 10^7$ Pa at 50° C.

The half value width of diffraction light in the volume hologram recorded on the volume hologram layer is not more than 30 nm. The volume hologram, which has been recorded using a color tuning film and has a half value width of more than 30 nm in the diffraction light thereof, is free from spotty hologram defects in the pressed state, although the detailed reason is not known. The present invention is particularly useful in color Lippmann holograms or single color holograms having a half value width of not more than 30 nm in the diffraction light of the volume hologram.

The pressure-sensitive adhesive layers 3, 4 will be described. An acrylic pressure-sensitive adhesive is used as the pressure-sensitive adhesive layer. The acrylic pressure-sensitive adhesive is composed mainly of an acrylic copolymer resin produced by copolymerizing an alkyl acrylate, other monomer, and a functional monomer.

The alkyl group in the alkyl acrylate has 4 to 15 carbon atoms. Examples of alkyl acrylates usable herein include n-butyl acrylate, 2-ethylhexyl acrylate, isooctyl acrylate, and isononyl acrylate. They may be used alone or as a mixture of two or more.

Other monomers include, for example, methyl acrylate, methyl methacrylate, styrene, acrylonitrile, and vinyl acetate. They may be used alone or as a mixture of two or more.

Functional monomers include, for example, acrylic acid, methacrylic acid, itaconic acid, hydroxyethyl acrylate, hydroxyethyl methacrylate, propylene glycol acrylate, acrylamide, methacrylamide, glycidyl acrylate, glycidyl methacrylate, dimethylaminoethyl methacrylate, and tert-butylaminoethyl methacrylate. They may be used alone or as a mixture of two or more.

The constituent ratio (% by weight) of the alkyl acrylate to the other monomer to the functional monomer in the acrylic copolymer resin is 70 to 99:0 to 20:0.01 to 20, preferably 80 to 95:0 to 10:0.1 to 15. The acrylic copolymer resin has a weight average molecular weight of 700,000 to 1,200,000, preferably 800,000 to 1,000,000.

The acrylic pressure-sensitive adhesive contains the acrylic copolymer resin, a crosslinking agent for room temperature crosslinking or heat crosslinking, and optionally a tackifier in a suitable solvent.

The crosslinking agent for room temperature crosslinking is one which enables crosslinking of the acrylic pressure-sensitive adhesive by aging at room temperature. Specific examples of such crosslinking agents include polyisocyanate compounds and trimers of these polyisocyanate compounds, isocyanate-terminated urethane prepolymers produced by reacting the polyisocyanate compounds with polyol compounds, polyisocyanate compounds thereof, and trimers of these polyisocyanate compounds.

Specific examples of polyisocyanates include 2,4-tolylene diisocyanate, 2,5-tolylene diisocyanate, 1,3-xylylene diisocyanate, 1,4-xylylene diisocyanate, diphenylmethane-4,4'-diisocyanate, 3-methyldiphenylmethane diisocyanate, hexamethylene diisocyanate, isophorone diisocyanate, dicyclohexylmethane-4,4'-diisocyanate, dicyclohexylmethane-2,4'-diisocyanate, and lysine isocyanate. Metal chelate compounds of aluminum, titanium or the like or polyfunctional epoxy compounds may be used as a crosslinking agent.

The crosslinking agent for room temperature crosslinking is preferably added in an amount of 0.005 to 20 parts by weight, particularly preferably 0.01 to 10 parts by weight, based on 100 parts by weight of the acrylic copolymer resin.

The crosslinking agent for heat crosslinking is such that the function of crosslinking can be attained by heating the acrylic pressure-sensitive adhesive at 100° C. or above, preferably 130° C. or above, for a heating time of one min to 30 min. Specific examples of crosslinking agents for heat crosslinking include methylol-containing compounds produced by reacting formaldehyde with melamine, benzoguanamine, urea or the like, and etherification products produced by partially or entirely etherifying the methylol groups with an aliphatic alcohol.

The crosslinking agent for heat crosslinking is preferably added in an amount of 0.01 to 25 parts by weight, particularly preferably 0.1 to 20 parts by weight, based on 100 parts by weight of the acrylic copolymer resin.

The tackifier is optionally added to the acrylic pressure-sensitive adhesive from the viewpoint of improving the tackiness. Tackifiers usable herein include, for example, rosin resins, terpene resins, and xylene resins. The tackifier may be added in an amount of 0 to 50% by weight, preferably 0 to 40% by weight, based on the acrylic pressure-sensitive adhesive.

For the acrylic pressure-sensitive adhesive, the acrylic copolymer resin, the crosslinking agent for room temperature crosslinking or heat crosslinking and optionally the tackifier is added to a solvent, such as methyl ethyl ketone, toluene, ethyl acetate, ethanol, or isopropanol, to prepare a solvent-type pressure-sensitive adhesive having a solid content of 15 to 50% by weight, preferably 20 to 35% by weight. The solvent-type pressure-sensitive adhesive is coated by means of a knife coater, a gravure coater or the like to a coating thickness on a dry basis of 4 to 30 µm, preferably 5 to 25 µm. The coating is then crosslinked by aging at room temperature in the case of the room temperature crosslinking type or by heating at the above-described temperature in the case of the heat crosslinking type to form first and/or second pressure-sensitive adhesive layers.

The present inventors have found that the problem of hologram defects can be solved by specifying the dynamic storage modulus at 50° C. and the loss tangent (tan δ) defined by dynamic loss modulus/dynamic storage modulus at 120° C. for the second pressure-sensitive adhesive layer adjacent to the hologram layer.

The dynamic storage modulus at 50° C. and the loss tangent (tan δ) defined by dynamic loss modulus/dynamic storage modulus at 120° C. for the second pressure-sensitive adhesive layer provided between the volume hologram layer and the surface protective film according to the present invention is one of the properties which reflects the hardness of the pressure-sensitive adhesive layer, and is measured by the following equipment and method.

Sample: An acrylic pressure-sensitive adhesive was coated on a release film A (SP-PET-05-50-BU, manufactured by Tohcello Co., Ltd.) to a coating thickness on a dry basis of 15 µm. A release film B (SP-PET-02-50-BU, manufactured by Tohcello Co., Ltd.) is then laminated on the coating, followed by aging at room temperature for one week in the case of room temperature crosslinking type, or by heating at 140° C. for 15 min in the case of heat crosslinking type to form a pressure-sensitive adhesive layer (a measuring sample). In the measurement, the release film A was peeled off, and the pressure-sensitive adhesive layer was wound around a spatula or the like from the release film B with caution to prevent the inclusion of air bubbles, thereby forming a roll which has a size suitable for housing in a parallel plate (compression) (4.75 mmØ) as a measuring attachment (mode) in the following measuring equipment and has a given thickness (when set in the measuring equipment) of 2.5 to 3.5 mm.

Equipment: Viscoelastic analyzer RSA-II, manufactured by Rheometrics

Attachment (mode): Parallel plate (compression) 4.75 mmØ

Frequency: 6.28 rad/sec

Temp.: −100° C. to 200° C.

Method:
(1) The measuring sample is sandwiched between parallel plates, and set in the measuring equipment.
(2) The temperature dependency at a measuring frequency of 6.28 rad/sec in a temperature region of −100° C. to 200° C. is measured. The dynamic storage modulus (Pa) at 50° C., the dynamic storage modulus (Pa) at 120° C., and the dynamic loss modulus (Pa) are determined from data on the temperature dependency, and the loss tangent (tan δ) at 120° C. was determined as the ratio of the dynamic loss modulus (Pa) at 120° C. to the dynamic storage modulus (Pa) at 120° C.

Figure 2:
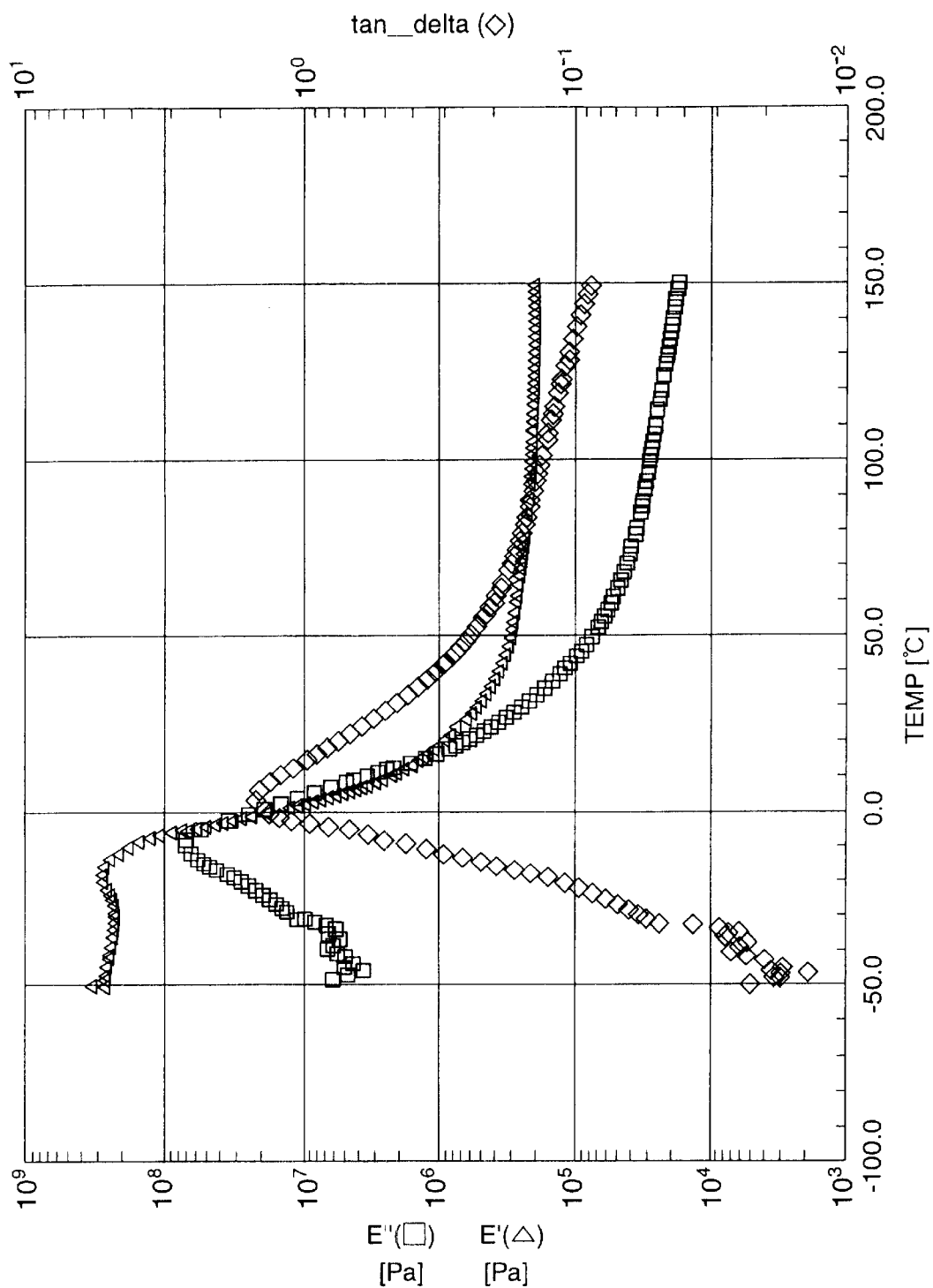
FIG. 2 is a diagram showing the temperature dependency of dynamic storage modulus, dynamic loss modulus, and loss tangent (tan δ) as measured at a measuring frequency of 6.28 rad/sec for the second pressure-sensitive adhesive layer in Example 1.

One example of data on the temperature dependency of the dynamic storage modulus {E'(Δ)}, dynamic loss modulus {E"(□)}, and loss tangent {tan δ(◇)} in a temperature region of −100° C. to 200° C. is shown in FIG. 2. The example shown in the drawing is data for the second pressure-sensitive adhesive layer prepared in Example 1 below.

The second pressure-sensitive adhesive layer in the volume hologram laminate according to the present invention has a dynamic storage modulus of not less than $2.5 \times 10^5$ Pa, preferably $2.5 \times 10^5$ Pa to $5 \times 10^7$ Pa, as measured under conditions of 6.28 rad/sec and 50° C.

The present inventors have found that, even when the dynamic storage modulus at 50° C. is not less than $2.5 \times 10^5$ Pa, a loss tangent (tan δ) value of more than 0.15 at 120° C. causes spotty hologram defects under pressed conditions.

This type of pressure-sensitive adhesive layer generally becomes rubbery at 100° C. or above. Therefore, the value of loss tangent (tan δ) at 120° C., which brings about a complete rubbery state, may be regarded as a value indicating one property of the pressure-sensitive adhesive layer. In order to prevent spotty hologram defects under pressed conditions, the pressure-sensitive adhesive layer should satisfy a dynamic storage modulus of not less than $2.5 \times 10^5$ Pa at 50° C. and, at the same time, a loss tangent (tan δ) value of not more than 0.15, preferably not more than 0.1. The lower limit of the loss tangent (tan δ) is about 0.01, although the lower limit varies depending upon the properties of the pressure-sensitive adhesive.

Next, the surface protective film 6 in the volume hologram laminate according to the present invention will be described. The surface protective film 6 is transparent, and examples thereof include films of resins, such as polyethylene, polypropylene, polyethylene fluoride, polyvinylidene fluoride, polyvinyl chloride, polyvinylidene chloride, ethylene-vinyl alcohol, polyvinyl alcohol, polymethyl methacrylate, polyether sulfone, polyether ether ketone, polyamide, tetrafluoroethylene-perfluoroalkyl vinyl ether copolymer, PET, and polyimide. The film thickness is generally 2 to 200 µm, preferably 10 to 50 µm.

If necessary, a hardcoat (not shown) may be provided on the surface protective film from the viewpoint of enhancing the protective properties of the surface protective film in its surface. The hardcoat may be formed, for example, by coating a silicone, fluorosilicone, melamine alkyd, urethane acrylate (ultraviolet-curable) or other system by dipping, spraying, or roll coating to a thickness of 1 to 50 µm, preferably 3 to 25 µm.

Likewise, the surface of the surface protective film 7 or the surface of the hardcoat may be subjected to release treatment (not shown). The release treatment may be carried out by coating a fluoro release agent, a silicone release agent, a stearate release agent, a wax release agent or the like by dipping, spraying, or roll coating.

EXAMPLES

The present invention will be described in more detail with reference to the following examples.

Example 1

Preparation of Transparent Protective Film/second Pressure-sensitive Adhesive Layer/release Film A pressure-sensitive adhesive solution having the following composition was coated by means of a knife coater on a release film (thickness 50 μm, SP-PETO5-50-BU, manufactured by Tohcello Co., Ltd.) comprising a silicone resin coated on a PET film to a coating thickness on a dry basis of 10 μm to form a room temperature-crosslinked pressure-sensitive adhesive layer.

Acrylic copolymer resin (n-butyl acrylate/methyl methacrylate/acrylic acid copolymer, weight average molecular weight 900,000) . . . 100 pts.wt.

Crosslinking agent for room temperature crosslinking (polyisocyanate: Coronate L, manufactured by Nippon Polyurethane Industry Co., Ltd.) . . . 1.44 pts.wt.

Solvent (mixed solvent of ethyl acetate/toluene/methyl ethyl ketone=20/60/20(volume ratio)) . . . 200 pts.wt.

A PET film (thickness 50 μm, Lumirror T-60, manufactured by Toray Industries, Inc.) as a transparent protective film was laminated on the room temperature-crosslinked pressure-sensitive adhesive layer.

For this pressure-sensitive adhesive layer, the dynamic storage modulus (E') and the dynamic loss modulus (E") were measured at a measuring frequency of 6.28 rad/sec in the temperature range of −100° C. to 200° C. in the same manner as described above. The results of measurement and the calculation results of loss tangent (tan δ) are shown in FIG. 2. As can be seen from FIG. 2, the dynamic storage modulus at 50° C. was $3.3 \times 10^5$ Pa, and the loss tangent (tan δ) at 120° C. was 0.11.

Preparation of Release Film A/first Pressure-sensitive Adhesive Layer/release Film B A pressure-sensitive adhesive solution having the same composition as the second pressure-sensitive adhesive layer was immediately coated to a thickness on a dry basis of 15 μm by means of a knife coater on a release film A (thickness 50 μm, SP-PETO5-50-BU, manufactured by Tohcello Co., Ltd.) comprising a silicone resin coated on a PET film. A release film B (thickness 50 μm, SP-PETO2-50-BU, manufactured by Tohcello Co., Ltd.) comprising a silicone resin coated on a PET film was laminated on the coating.

Preparation of Hologram Recording Film

A color Lippmann hologram was recorded by laser beams having wavelengths of 458 nm, 532 nm, and 647 nm on a hologram recording film (HRF 800×001, manufactured by E. I. du Pont de Nemours & Co.) of a laminate composed of a PET film (thickness 50 μm)/hologram recording material layer (thickness 15 μm)/PET film (thickness 50 μm). This volume hologram layer had a glass transition point of 46° C., and a dynamic storage modulus of $6.28 \times 10^6$ Pa at a measuring frequency of 6.28 rad/sec and a temperature of 50° C.

Next, one of the PET films in the hologram recording film was peeled off. Separately, the release film was separated from the transparent protective film/second pressure-sensitive adhesive layer/release film prepared above. The surface of the second pressure-sensitive adhesive layer was laminated on the hologram recording film on its surface from which the PET film had been removed, followed by heating at 140° C. for 15 min. Thus, a transparent protective film/second pressure-sensitive adhesive layer/hologram recording layer/PET film was prepared.

Preparation of Hologram Laminate

The PET film was peeled from the hologram recording film prepared above. Separately, the release film A was peeled from the release film A/first pressure-sensitive adhesive layer/release film B prepared above, followed by lamination of both the structures on top of the other to prepare a transparent protective film/second pressure-sensitive adhesive layer/hologram recording layer/first pressure-sensitive adhesive layer/release film B. This hologram was evaluated for spectral properties. As a result, the half value width was 17 to 20 nm.

The release film B was then peeled off, and the structure with the release film B removed therefrom was applied onto a paper substrate. The laminate was stored for 3 days under conditions of 50° C. and 0.12 kg/cm². The hologram after the storage was visually inspected for hologram defects at an angle, which enables the defects to be seen most deeply, under a three bright-line fluorescent tube (HI-LUMIC N FL4EX-N-PK, manufactured by Hitachi, Ltd.). As a result, the defect level of the hologram was 0.4, indicating that the storage stability was excellent.

In the determination of the defect level, the state of freedom from spotty hologram defect was presumed to be 0 (zero), and the formed spots were visually evaluated for the size (mm) and the depth (relative value 1–10). The product of the size by the depth was regarded as the defect level. When the defect level was not more than 3, the hologram was regarded as having excellent storage stability.

Example 2

A hologram laminate was prepared in the same manner as in Example 1, except that, instead of the pressure-sensitive adhesive solution in Example 1, a pressure-sensitive adhesive solution having the following composition was used to form a room temperature-crosslinked pressure-sensitive adhesive layer.

Acrylic copolymer resin (n-butyl acrylate/methyl methacrylate/acrylic acid copolymer, weight average molecular weight 1,000,000) . . . 100 pts.wt.

Crosslinking agent for room temperature crosslinking (polyisocyanate: Coronate L, manufactured by Nippon Polyurethane Industry Co., Ltd.) . . . 1.5 pts.wt.

Solvent (mixed solvent of ethyl acetate/toluene/methyl ethyl ketone=20/60/20(volume ratio)) . . . 200 pts.wt.

Figure 3:
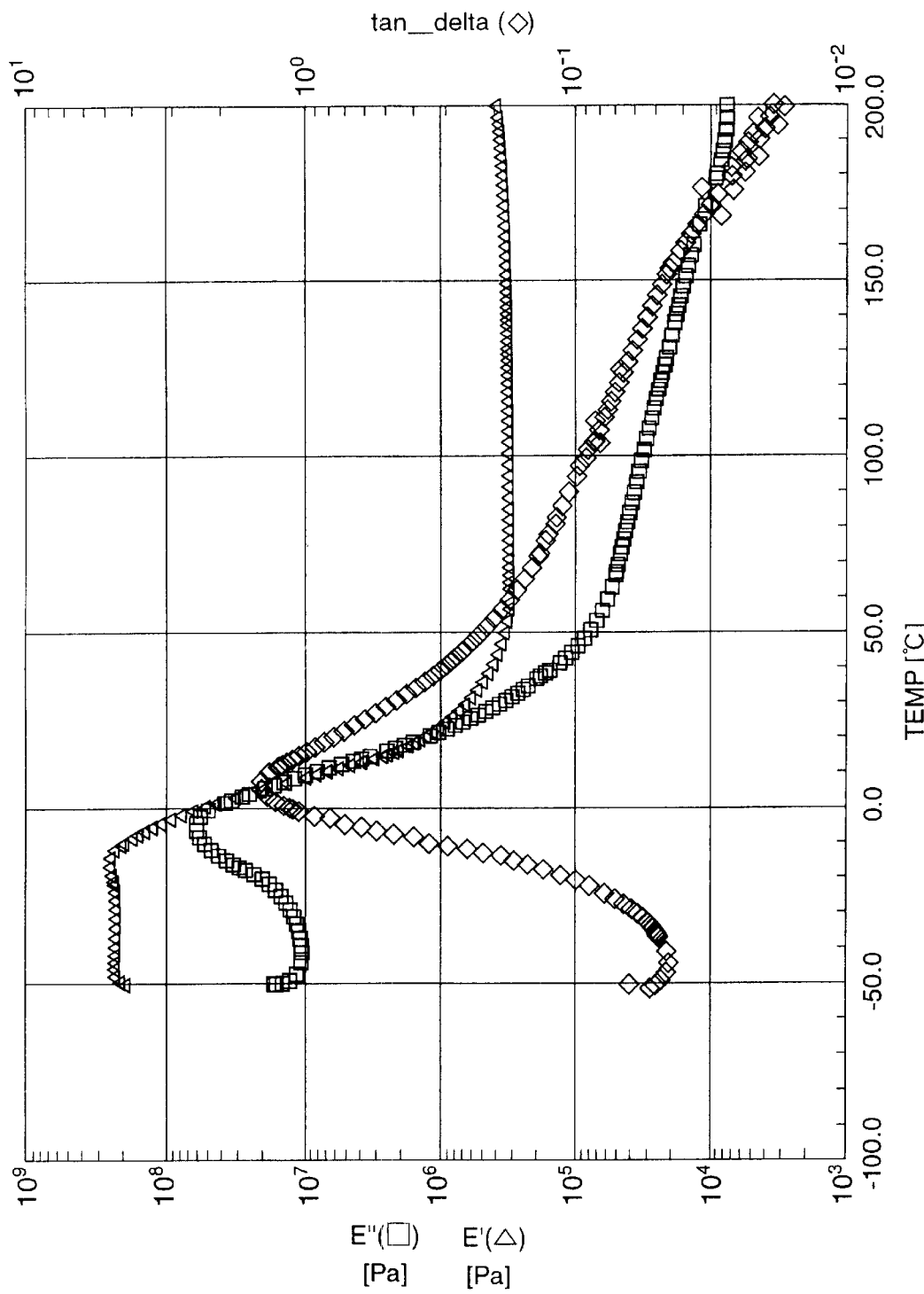
FIG. 3 is a diagram showing the temperature dependency of dynamic storage modulus, dynamic loss modulus, and loss tangent (tan δ) as measured at a measuring frequency of 6.28 rad/sec for the second pressure-sensitive adhesive layer in Example 2.

The results of measurement at a frequency of 6.28 rad/sec and the like in the second pressure-sensitive adhesive layer are shown in FIG. 3. As can be seen from FIG. 3, the dynamic storage modulus at 50° C. was $3.5 \times 10^5$ Pa, and the loss tangent (tan δ) at 120° C. was 0.07.

A storage test was carried out in the same manner as in Example 1. As a result, the defect level of the hologram was 0.4, indicating that the storage stability was excellent.

Example 3

Instead of the pressure-sensitive adhesive solution in Example 1, a pressure-sensitive adhesive solution having the following composition was immediately coated by means of a knife coater to a thickness on a dry basis of 10 μm.

Acrylic copolymer resin (n-butyl acrylate/methyl methacrylate/acrylic acid copolymer, weight average molecular weight 900,000) . . . 100 pts.wt.

Crosslinking agent for heat crosslinking (curing agent B, methylol-containing compound, manufactured by Saiden Chemical Industry Co., Ltd.) . . . 1.5 pts.wt.

Solvent (mixed solvent of ethyl acetate/toluene/methyl ethyl ketone=20/60/20 (volume ratio)) . . . 200 pts.wt.

The pressure-sensitive adhesive layer was then heat treated at 140° C. for 15 min, thereby forming a heat-crosslinked pressure-sensitive adhesive layer. A PET film (thickness 50 μm, Lumirror T-60, manufactured by Toray Industries, Inc.) was laminated on the heat-crosslinked pressure-sensitive adhesive layer.

Figure 4:
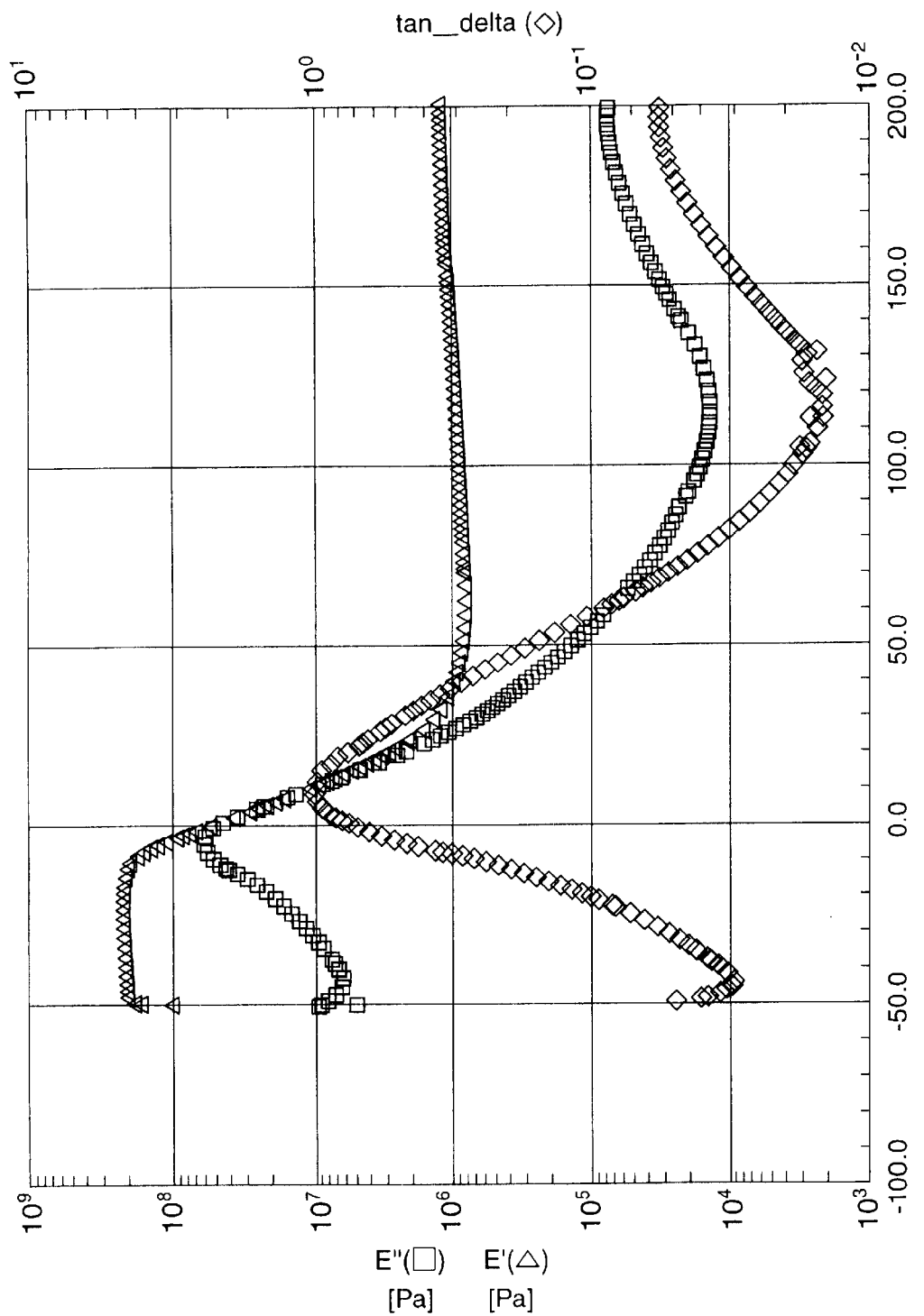
FIG. 4 is a diagram showing the temperature dependency of dynamic storage modulus, dynamic loss modulus, and loss tangent (tan δ) as measured at a measuring frequency of 6.28 rad/sec for the second pressure-sensitive adhesive layer in Example 3.

The results of measurement at a frequency of 6.28 rad/sec and the like in the pressure-sensitive adhesive layer are shown in FIG. 4. As can be seen from FIG. 4, the dynamic storage modulus at 50° C. was 8.9×10$^5$ Pa, and the loss tangent (tan δ) at 120° C. was 0.03.

A storage test was carried out in the same manner as in Example 1. As a result, the defect level of the hologram was 0.4, indicating that the storage stability was excellent.

Comparative Example 1

A hologram laminate was prepared in the same manner as in Example 1, except that, instead of the pressure-sensitive adhesive solution in Example 1, a pressure-sensitive adhesive solution having the following composition was used to form a room temperature-crosslinked pressure-sensitive adhesive layer.

Acrylic copolymer resin (n-butyl acrylate/methyl methacrylate/acrylic acid copolymer, weight average molecular weight 900,000) . . . 100 pts.wt.

Crosslinking agent for room temperature crosslinking (polyisocyanate: Coronate L, manufactured by Nippon Polyurethane Industry Co., Ltd.) . . . 0.7 pt.wt.

Solvent (mixed solvent of ethyl acetate/toluene/methyl ethyl ketone=20/60/20(volume ratio)) . . . 200 pts.wt.

Figure 5:
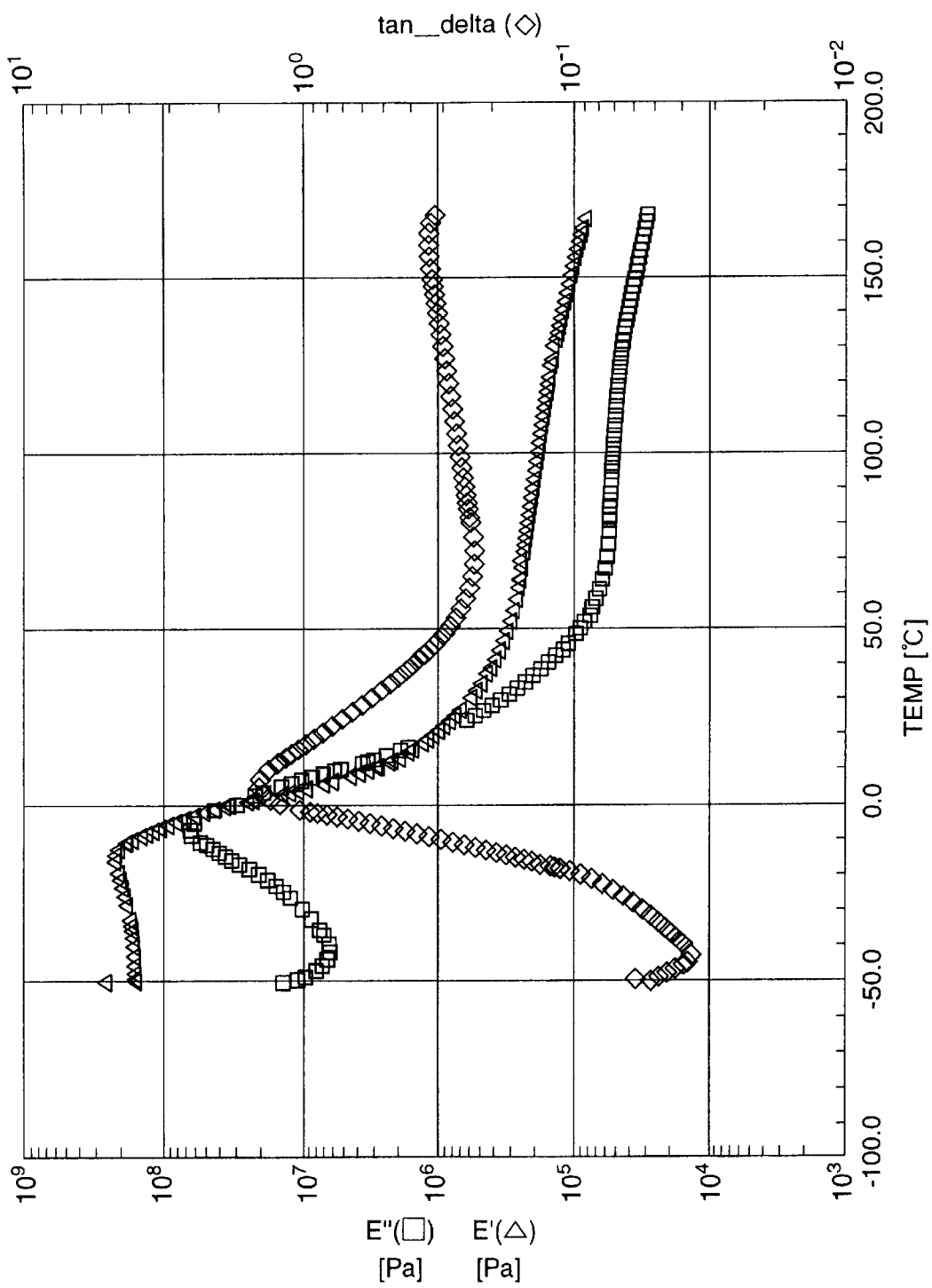
FIG. 5 is a diagram showing the temperature dependency of dynamic storage modulus, dynamic loss modulus, and loss tangent (tan δ) as measured at a measuring frequency of 6.28 rad/sec for the second pressure-sensitive adhesive layer in Comparative Example 1.

The results of measurement at a measuring frequency of 6.28 rad/sec and the like in the second pressure-sensitive adhesive layer are shown in FIG. 5. As can be seen from FIG. 5, the dynamic storage modulus at 50° C. was 3.2×10$^5$ Pa, and the loss tangent (tan δ) at 120° C. was 0.29.

A storage test was carried out in the same manner as in Example 1. As a result, it was found that spotty dot defects occurred in the hologram. The defect level was 4.5, indicating that the hologram had a problem of storage stability.

Comparative Example 2

A hologram laminate was prepared in the same manner as in Example 1, except that, instead of the pressure-sensitive adhesive solution in Example 1, a pressure-sensitive adhesive solution having the following composition was used to form a room temperature-crosslinked pressure-sensitive adhesive layer.

Acrylic copolymer resin (2-ethylhexyl acrylate/vinyl acetate/acrylic acid copolymer, weight average molecular weight 600,000) . . . 100 pts.wt.

Crosslinking agent for room temperature crosslinking (polyisocyanate: Coronate L, manufactured by Nippon Polyurethane Industry Co., Ltd.)

Solvent (mixed solvent composed of ethyl acetate/toluene=50/50 (volume ratio)) . . . 180 pts.wt.

Figure 6:
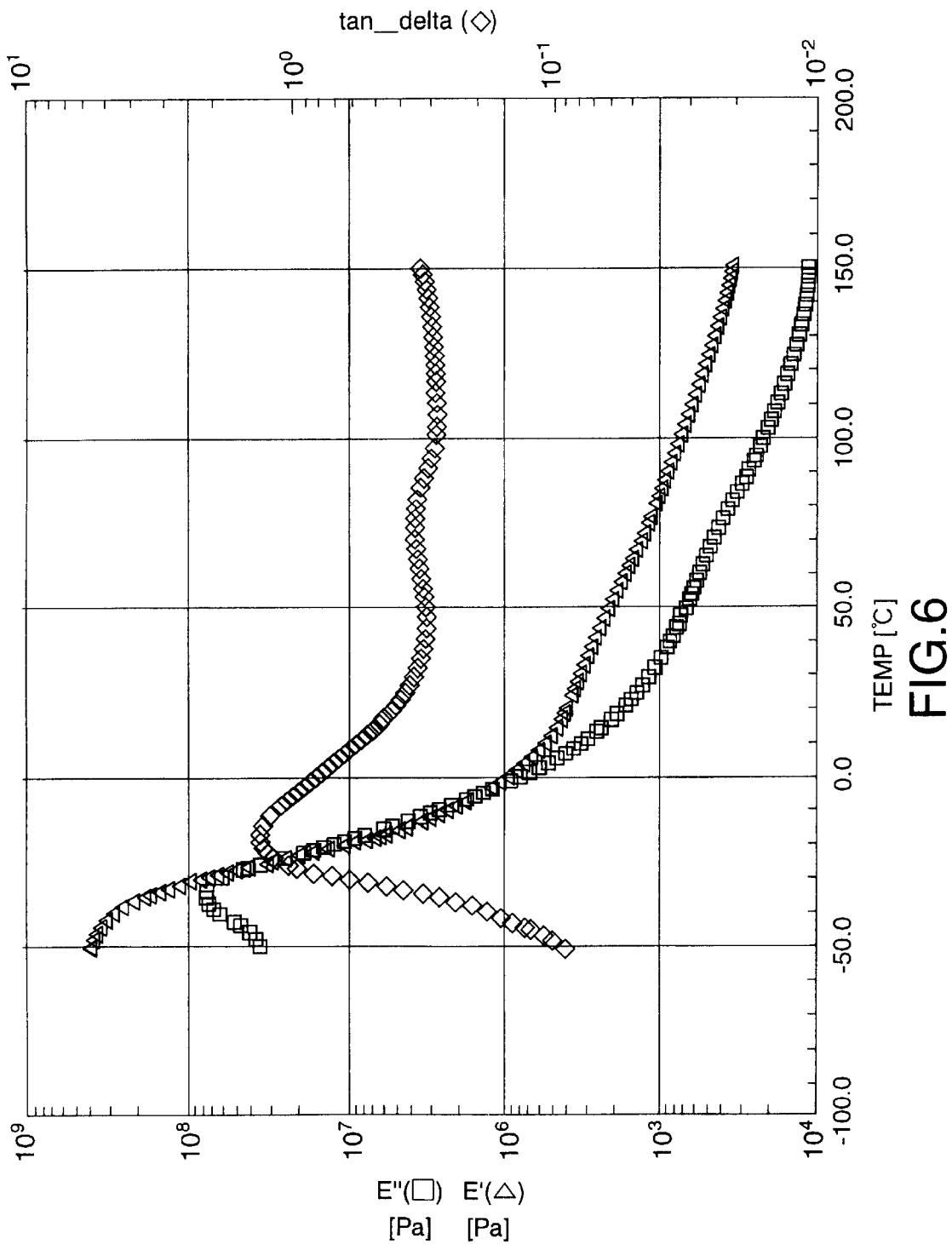
FIG. 6 is a diagram showing the temperature dependency of dynamic storage modulus, dynamic loss modulus, and loss tangent (tan δ) as measured at a measuring frequency of 6.28 rad/sec for the second pressure-sensitive adhesive layer in Comparative Example 2.

The results of measurement at a frequency of 6.28 rad/sec and the like in the second pressure-sensitive adhesive layer are shown in FIG. 6. As can be seen from FIG. 6, the dynamic storage modulus at 50° C. was 2×10$^5$ Pa, and the loss tangent (tan δ) at 120° C. was 0.28.

A storage test was carried out in the same manner as in Example 1. As a result, it was found that spotty dot defects occurred in the hologram. The defect level was 9, indicating that the hologram had a problem of storage stability.

The pressure-sensitive adhesive for a pressure-sensitive adhesive layer in the volume hologram laminate according to the present invention, when kept in the pressed state, for example, during storage, is less likely to cause spotty hologram defects in the volume hologram layer.

What is claimed is:

1. A volume hologram laminate comprising a substrate and, formed on the substrate in the following order, a first pressure-sensitive adhesive layer, a volume hologram layer, a second pressure-sensitive adhesive layer, and a surface protective film, said second pressure-sensitive adhesive layer having been formed from an acrylic pressure-sensitive adhesive comprising an acrylic copolymer resin, composed mainly of an alkyl acrylate, and a crosslinking agent, said second pressure-sensitive adhesive layer having a dynamic storage modulus of not less than 2.5×10$^5$ Pa as measured at a measuring frequency of 6.28 rad/sec and a temperature of 50° C. and a loss tangent (tan δ) defined as dynamic loss modulus/dynamic storage modulus at 120° C. of not more than 0.15.

2. The volume hologram laminate according to claim 1, wherein the crosslinking agent of the second pressure-sensitive adhesive layer is a crosslinking agent for room temperature crosslinking.

3. The volume hologram laminate according to claim 1, wherein the crosslinking agent of the second pressure-sensitive adhesive layer is a crosslinking agent for thermal crosslinking.

* * * * *

UNITED STATES PATENT AND TRADEMARK OFFICE
CERTIFICATE OF CORRECTION

| | |
|---|---|
| PATENT NO. | : 6,509,076 B1 |
| APPLICATION NO. | : 09/679537 |
| DATED | : January 21, 2003 |
| INVENTOR(S) | : Hiroyuki Otaki et al. |

It is certified that error appears in the above-identified patent and that said Letters Patent is hereby corrected as shown below:

On The Title Page, Item (73) Assignee: change from "Dai Nippon Printing Co., Ltd. (JP)" to --Dai Nippon Printing Co., Ltd. (JP) and Lintec Corporation (JP)--.

Signed and Sealed this

Seventeenth Day of July, 2007

JON W. DUDAS
*Director of the United States Patent and Trademark Office*